(12) United States Patent
Elstorpff (10) Patent No.: US 9,956,970 B2
(45) Date of Patent: May 1, 2018

(54) BRAKE SYSTEM HAVING AN ELECTROMAGNETIC TRACK BRAKE DEVICE

(75) Inventor: Marc-Gregory Elstorpff, Munich (DE)

(73) Assignee: KNORR-BREMSE SYSTEME FUR SCHIENENFAHRZEUGE GMBH, Munich (DE)

( * ) Notice: Subject to any disclaimer, the term of this patent is extended or adjusted under 35 U.S.C. 154(b) by 983 days.

(21) Appl. No.: 14/237,992

(22) PCT Filed: Aug. 10, 2012

(86) PCT No.: PCT/EP2012/065660
§ 371 (c)(1),
(2), (4) Date: Feb. 19, 2014

(87) PCT Pub. No.: WO2013/024014
PCT Pub. Date: Feb. 21, 2013

(65) Prior Publication Data
US 2014/0190512 A1    Jul. 10, 2014

(30) Foreign Application Priority Data

Aug. 12, 2011 (DE) .................. 10 2011 110 050

(51) Int. Cl.
*B61H 7/12* (2006.01)
*B61H 11/00* (2006.01)
(Continued)

(52) U.S. Cl.
CPC ............... *B61H 11/00* (2013.01); *B08B 7/00* (2013.01); *B60T 1/04* (2013.01); *B61H 7/00* (2013.01);
(Continued)

(58) Field of Classification Search
CPC .......... B61H 7/00; B61H 11/00; B61H 13/00; B61C 15/10; B61C 15/14; B61C 15/107; B60T 8/1705
(Continued)

(56) References Cited

U.S. PATENT DOCUMENTS 3,881,578 A * 5/1975 Dubreucq ............. B60T 13/748
188/165
4,062,295 A * 12/1977 Hamann ................. B61B 13/08
104/259
(Continued)

FOREIGN PATENT DOCUMENTS

CN    101119880 A    2/2008
CN    102113104 A    6/2011
(Continued)

OTHER PUBLICATIONS

English Machine Translation of DE845962.*
(Continued)

*Primary Examiner* — Christopher P Schwartz
(74) *Attorney, Agent, or Firm* — Barnes & Thornburg LLP (57) ABSTRACT

A brake control device for a brake system, wherein the brake system has at least one electromagnetic track brake device, which can be supplied with current at variable amperage according to the brake control device to create a braking force, and wherein the brake control device is designed to actuate the at least one electromagnetic track brake device at a cleaning amperage during travel in order to clean a rail. Also disclosed is a brake system having such a brake control device, a rail vehicle, and a method for cleaning a rail by means of an electromagnetic track brake device.

11 Claims, 2 Drawing Sheets

(51) Int. Cl.
*B61H 7/08* (2006.01)
*E01H 8/10* (2006.01)
*B60T 1/04* (2006.01)
*B08B 7/00* (2006.01)
*B61H 7/00* (2006.01)
*B61H 13/00* (2006.01)

(52) U.S. Cl.
CPC ............... *B61H 7/08* (2013.01); *B61H 13/00* (2013.01); *E01H 8/10* (2013.01)

(58) Field of Classification Search
USPC .......... 303/3, 15, 20, 128; 188/156–165, 41; 105/34.2; 701/20; 104/259
See application file for complete search history.

(56) References Cited

U.S. PATENT DOCUMENTS

| | | | | |
|---|---|---|---|---|
| 4,701,682 | A * | 10/1987 | Hirotsu | B60L 3/10 180/197 |
| 5,526,755 | A * | 6/1996 | Dalrymple | E01B 5/02 105/77 |
| 5,647,458 | A * | 7/1997 | van der Sloot | B61H 7/08 188/165 |
| 6,208,097 | B1 * | 3/2001 | Reddy | B60L 3/10 180/197 |
| 6,629,709 | B1 * | 10/2003 | Tunley | B61C 15/107 188/35 |
| 7,027,900 | B2 * | 4/2006 | Kumar | B61C 15/14 180/197 |
| 7,290,807 | B2 * | 11/2007 | Kumar | B61C 15/10 291/2 |
| 7,467,830 | B2 * | 12/2008 | Donnelly | B60L 3/102 105/34.2 |
| 8,989,927 | B2 * | 3/2015 | Herden | B60T 8/1705 303/7 |
| 9,278,701 | B2 * | 3/2016 | Elstorpff | B60T 8/1705 |
| 2012/0061367 | A1 * | 3/2012 | Wolff | B61C 15/107 219/202 |
| 2014/0222258 | A1 * | 8/2014 | Elstorpff | B60T 8/1705 701/19 |

FOREIGN PATENT DOCUMENTS

| | | | |
|---|---|---|---|
| DE | 845962 | * 8/1952 | ............... B61H 7/08 |
| DE | 845962 C | 8/1952 | |
| DE | 945 962 | 7/1956 | |
| DE | 10009331 A1 | 9/2001 | |
| DE | 102005016164 A1 | 10/2006 | |
| EP | 1712445 | * 10/2006 | ............ B60T 8/1705 |
| EP | 1712445 A1 | 10/2006 | |
| JP | S49-80471 | 8/1974 | |
| JP | 3-266767 A | 11/1991 | |
| JP | 2000-177587 A | 6/2000 | |
| JP | 2003-237561 A | 8/2003 | |

OTHER PUBLICATIONS

English Machine Translation of EP1712445.*
Japanese Office Action for Japanese Application No. 2014-525406, dated Jun. 27, 2016, along with English Translation.
Chinese Office Action for Chinese Patent No. 201280039487.3 dated Jun. 17, 2015, along with the English Translation.
Notification Concerning Transmittal of International Preliminary Report on Patentability and Written Opinion of the International Search Authority for International Patent Application No. PCT/EP2012/065660, dated Aug. 10, 2012.
English Translation of Notification Concerning Transmittal of International Preliminary Report on Patentability and Written Opinion of the International Search Authority for International Patent Application No. PCT/EP2012/065660, dated Aug. 10, 2012.
Search Report for International Patent Application No. PCT/EP2012/065660; dated Jul. 15, 2013.

* cited by examiner

BRAKE SYSTEM HAVING AN ELECTROMAGNETIC TRACK BRAKE DEVICE

PRIORITY CLAIM

This patent application is a U.S. National Phase of International Patent Application No. PCT/EP2012/065660, filed 10 Aug. 2012, which claims priority to German Patent Application No. 10 2011 110 050.8, filed 12 Aug. 2011, the disclosures of which are incorporated herein by reference in their entirety.

FIELD

Disclosed embodiments relate to a brake control device for a brake system of a rail vehicle having a magnetic track brake device, to a brake system having a brake control device of this kind, to a rail vehicle, and also to a method for controlling at least one magnetic track brake device of a brake system of a rail vehicle.

BACKGROUND

Modern rail vehicles often have brake systems having a plurality of brake devices which act in different ways. A service brake device, such as a pressure-operated brake device, for example a hydraulic or pneumatic brake, is generally provided. Besides this, eddy current brakes, retarders or else magnetic track brakes, amongst others, are additionally used. In contrast to the eddy current brake, the magnetic track brake device here is a friction brake device which, when it is operated, is brought into frictional contact with the rail. As a result of current being applied, the magnetic track brake device is magnetized and adheres strongly to the rail. The magnetic track brake device is subject to considerable wear in the process. Magnetic track brake devices are used for supporting the braking action of the normal service brake device, in particular when carrying out rapid braking or emergency braking. If the magnetic track brake device is in frictional contact with the rail, it can also remove materials such as leaves, water, etc. which are located on the rail during travel. Therefore, the use of a magnetic track brake device also serves to clean the rail, as a result of which, in particular, the adhesion between wheel and rail can be improved, this generally being parameterized as an adhesion coefficient.

Disclosed embodiments allow improved operation of a magnetic track brake device during track cleaning. Wear of the magnetic track brake device is intended to be reduced in the process.

SUMMARY

Within the scope of the disclosed embodiments, a rail vehicle can denote one or more carriages with or without their own drive and/or a traction vehicle in any desired combination. In particular, a rail vehicle can have rail cars. A rail vehicle or a carriage of a rail vehicle can have bogies on which wheel axles of the vehicle are arranged. The bogies can be attached to a carriage structure. A brake system can have at least a magnetic track brake device and a service brake device. A magnetic track brake device can comprise, as components, one or more solenoids which can be brought into contact with a rail and to which current can be applied. When current is applied, the solenoid or solenoids of the magnetic track brake device can adhere to the rail by virtue of a magnetic effect. It is conceivable that a magnetic track brake device has at least one mechanical and/or pneumatic and/or hydraulic operating device as a component. An operating device of this kind may be suitable for moving the solenoid or solenoids and/or frictional component or components of the magnetic track brake device from an inoperative position to a braking position, and vice versa. Provision may be made for operating devices of this kind to be actuated or operated pneumatically, electrically or hydraulically, for example by a brake control device. A frictional component of the magnetic track brake device can be provided for the purpose of being in frictional contact with the rail when braking is performed by means of the magnetic track brake device. A frictional component of this kind may be a solenoid or be attached to a solenoid. A service brake device may be an adhesion-dependent friction brake device which can transmit a braking force via a wheel/rail contact. A magnetic track brake device is not an adhesion-dependent friction brake device in this sense since it does not transmit a braking force via a wheel/rail contact, but rather can establish its own frictional contact with the rail. A service brake device can be, in particular, a pressure-operated brake device, for example a pneumatic or hydraulic brake device. In a brake device of this kind, a braking pressure can be generated, by means of which frictional elements of friction brake devices can be brought into frictional contact with one another to brake wheels and the vehicle. A service brake device can also be an electrically operated service brake device, for example an electromechanical or electrical service brake device. In a brake device of this kind, a braking current can be generated, by means of which frictional elements of friction brake devices can be brought into frictional contact with one another to brake wheels and the vehicle. Typical examples of service brakes of this kind are disk brakes, block brakes or combined disk and block brakes. In a pressure-operated service brake device, a braking pressure is converted into heat by exerting a braking force on frictional elements. Analogously, in an electrically operated service brake device, a braking current is converted into heat by exerting a braking force on frictional elements. In the event of braking by a service brake device, exerted braking torques or braking forces are absorbed via the wheel/rail contact. The amount of braking torque or braking force which can be absorbed via this wheel/rail contact is limited by a parameter which is generally called the adhesion coefficient. For a single wheel, this value depends on the loading on the wheel by a weight which bears on it and in particular depends on the contact conditions between wheel and rail. The adhesion coefficient may be very low, particularly when an intermediate layer, for example a layer of water or leaves, is formed between wheel and rail. Furthermore, the adhesion coefficient is highly dependent on a prevailing wheel slip. In this case, the wheel slip S is defined as $S=(vT-vR)/vT$, wherein vT denotes the translation speed of the rail vehicle and vR denotes the rotation speed of the wheel in question. If the wheel slip S of a wheel is exactly 0, no braking or acceleration force can be transmitted via this wheel. In general, the wheel in question can be driven to slide, lock or spin when, at a given prevailing adhesion coefficient, a braking force or an acceleration force which is above the force which can be transmitted at the prevailing adhesion coefficient is exerted on the wheel. Therefore, particularly in the event of a braking operation, care should generally be taken that the braking force which can be transmitted according to the prevailing adhesion coefficient is not exceeded. A service brake device can have an associated sliding protection apparatus which is designed to detect and possibly counteract sliding and/or locking of the wheels. To this end, outlet valves can be provided, for example in pneumatic service brake devices, the outlet valves reducing the braking pressure at suitable points when the sliding protection device is triggered, to reduce the transmitted braking force. A brake control device can be designed to actuate a magnetic track brake device. In this case, the brake control device can be provided separately for the magnetic track brake device. A brake control device can also be designed to actuate other brake devices of the brake system, such as the service brake device for example. The brake control device may be an electronic control device, such as a brake computer. It is conceivable for a brake control device for actuating the magnetic track brake device to comprise a plurality of separate control units which can be associated with different solenoids and/or operating devices of the magnetic track brake device. Actuation of the magnetic track brake device can comprise, in particular, electrical and/or hydraulic and/or pneumatic and/or electrohydraulic and/or electropneumatic actuation of operating devices of the magnetic track brake device. In this case, one or more solenoids can be moved between an inoperative position and a braking position by actuating the operating devices. When current is applied to the solenoid, frictional contact can be made between the magnetic track brake device and the rail. In this case, frictional components can be moved from the braking position into contact with the rail by solenoids. It is also conceivable for there to already be contact between magnetic track brake device and/or a frictional component and the rail in the braking position, this contact being strengthened by a current being applied. Current is expediently applied when the at least one solenoid which is to be actuated is in a braking position. In some vehicles, provision can also be made for the magnetic track brake device or its solenoids to already be close enough to the rail in the inoperative position that, when current is applied, frictional contact is made between the magnetic track brake device, in particular a frictional component, and the rail. In a case of this kind, an operating device can be dispensed with, and the inoperative position and the braking position can be the same. In particular, actuation of the magnetic track brake device can comprise applying current and/or deliberately supplying current and/or interrupting the supply of current to one or more solenoids of the magnetic track brake device. In general, activation and/or operation of a magnetic track brake device can comprise actuation of components of the magnetic track brake device in such a way that frictional contact is made between rail and magnetic track brake device, for example by actuating at least one operating device to move the magnetic track brake device to a braking position, and/or actuation for supplying current to one or more solenoids. Deactivation and/or release of a magnetic track brake device can comprise actuation of components of the magnetic track brake device in such a way that frictional contact is interrupted. In this case, supplying current to one or more solenoids can be interrupted and/or an operating device can move at least one component of the magnetic track brake device from a braking position to an inoperative position. It is conceivable for a magnetic track brake device to have a plurality of frictional components which can be actuated separately from one another and/or operating devices and/or solenoids. Therefore, a magnetic track brake device can be partially released and partially operated. Actuation can be performed according to prespecified braking parameters which can be provided, for example, by a central control device. A brake control device can be designed to actuate a magnetic track brake device based on or as a function of specific parameters. To this end, the brake control device can be designed to receive state data which corresponds to a parameter. State data of this kind can be provided, for example, by a sensor device to which the brake control device is connected or can be connected. It is also conceivable for the brake control device to be connected to at least one further control device for the purpose of data transmission to receive corresponding state data from the further control device. As an alternative or in addition, the brake control device can be designed to determine or to calculate state data which corresponds to the parameter in question based on sensor data which is received by a sensor device and/or a control device. Therefore, corresponding state data can be based on sensor data or be sensor data which is provided by suitable sensor devices. By way of example, a brake system can be connected or connectable to a sensor device, and/or a sensor device can be associated with the brake system. In this case, a sensor device can comprise, for example, wheel rotation speed sensors and/or speed sensors and/or braking action sensors, for example braking force sensors and/or braking torque sensors, and/or deceleration sensors and/or acceleration sensors. It is also conceivable for a control device of the brake system, in particular the brake control device for actuating the magnetic track brake device, to be connected to the sensor device and/or other control devices for data transmission purposes, to receive, for example, sensor data and/or state data and/or operating parameters.

BRIEF DESCRIPTION OF THE FIGURES

The invention will now be explained by way of example using disclosed embodiments with reference to the accompanying drawings, in which.

DETAILED DESCRIPTION OF THE DISCLOSED EMBODIMENTS

Disclosed embodiments relate to a brake control device for a brake system of a rail vehicle, wherein the brake system has at least one magnetic track brake device to which current can be applied at a variable current intensity to generate a braking force according to instructions from the brake control device. The brake control device is designed to operate the at least magnetic track brake device at a cleaning current intensity to clean a rail during travel. Therefore, cleaning of the rail by the magnetic track brake device can be actuated by means of the brake control device. This improves the adhesion between rail and the wheels which follow the magnetic track brake device or its frictional component. The brake control device can be designed to operate a magnetic track brake device, which is at the very front in the direction of travel of the rail vehicle or in the direction in which the rail vehicle is being pulled, to clean the rail. Application of current to the magnetic track brake device can comprise or describe, in particular, supplying current or applying current to one or more solenoids of the magnetic track brake device. In general, application of current or actuation of the magnetic track brake device according to instructions from the brake control device can be considered to be part of the actuation of the magnetic track brake device by the brake control device. It is conceivable for the magnetic track brake device and/or at least one solenoid of the magnetic track brake device to be connected or connectable to a source of electrical energy to be supplied with electric current. Supplying electrical energy by providing a current at a specific current intensity can be performed according to instructions from the brake control device. To this end, the brake control device can be connected or connectable to the magnetic track brake device and/or to the source of electrical energy in a suitable manner. A service brake device can be part of the brake system. In general, the brake system can have at least one further brake device which is not a magnetic track brake device. It is conceivable for the brake control device to be designed to actuate the magnetic track brake device separately and/or independently of a service brake device and/or further brake devices. Provision can be made for the brake control device to be designed to take into account state data which can relate, in particular, to another brake device, for example a service brake device, during the actuation of the magnetic track brake device. In general, the magnetic track brake device can be arranged upstream of the at least one wheel which is to be braked by a further braking device, in particular upstream of a wheel which is to be braked by a service brake device, in the direction of travel or direction in which magnetic track brake device is pulled. If the magnetic track brake device is actuated for a braking operation or for cleaning the rail, magnetic track brake device is brought into frictional contact with the rail. It is expedient when frictional contact is made between the magnetic track brake device and a frictional surface of the rail which subsequently also comes into frictional contact with at least one wheel surface of the vehicle. The profiles of the magnetic track brake device and/or of the wheels can be of corresponding design. On account of the contact between the magnetic track brake device and the frictional surface of the rail, rail is freed and cleaned of intermediate layers. The brake control device can be designed to monitor a rail state during a braking process and to actuate the magnetic track brake device based on a change rail state data which corresponds to the rail state. The brake control device can be designed to actuate the magnetic track brake device based on speed data. The speed data can relate, in particular, to a vehicle speed. The speed data can be state data which is acquired by a suitable sensor device, for example by speed sensors and/or based on data from wheel rotation speed sensors. The speed data can be transmittable by a further control device which is connected to the brake control device for data transmission purposes. Therefore, the current speed can also be taken into consideration when cleaning the rail. As an alternative or in addition, the brake control device can be designed to actuate the magnetic track brake device based on state data which describes a braking force which is exerted by a service brake device and/or a corresponding braking torque. State data of this kind can be based on sensor data which is determined and provided by at least one braking action sensor, such as a braking force sensor and/or a braking torque sensor. Corresponding sensors can be associated with the brake system for monitoring the service brake device. The brake control device can be designed, in particular, to take into account rail state data when operating or actuating the magnetic track brake device for cleaning the rail. The magnetic track brake devices can be operated for cleaning a rail by a corresponding driver command or an automatic command, for example, by a rail state sensor. Rail state data can relate to the presence of moisture or wetness on the rail, the presence of liquids and/or solid materials such as leaves, water, sand, dust, oil and/or snow or ice on the rail. Provision can be made, for example, for the brake control device to be connected or connectable to a corresponding sensor device or to a control device to receive moisture or wetness data or other rail state data. In this case, it may be expedient when the brake control device is designed to operate the magnetic track brake device at the cleaning current intensity based on a wetness signal or other rail state signal to clean the rail. In this case, the corresponding signal can indicate, for example, the presence of moisture or wetness on the rail or can relate to another rail state. A corresponding sensor can be, for example, an optical sensor which can be arranged in a front region of the rail vehicle. It is conceivable for the magnetic track brake device to have an operating device which can bring a frictional component of the magnetic track brake device into physical contact with a rail or an intermediate layer which is arranged on the rail, even without current being applied to a corresponding solenoid of the magnetic track brake device. In such a case, the cleaning current intensity can also be zero, so that the frictional component of the magnetic track brake device is brought into contact only by the operating device to clean the rail. Provision can be made for the brake control device to be designed to monitor a control parameter which can relate to, for example, a wheel slip, an adhesion coefficient, a braking action such as a braking force and/or a braking torque. To this end, the brake control device can be designed to receive corresponding state data which correspondingly relates to, for example, a wheel slip, an adhesion coefficient, a braking action such as a braking force and/or a braking torque. In particular, the brake control device can be designed to store and/or to monitor the time profile of a control parameter of this kind.

The cleaning current intensity can be lower than a braking current intensity at which current is applied to the magnetic track brake device during a braking operation. Therefore, the rail cleaning operation requires less energy than a braking operation and subjects the frictional component of the magnetic track brake device to less loading. In this case, a braking operation can be defined by there being a braking request signal which can be provided by a train driver, for example. A braking operation can also be defined by a further brake device of the brake system other than the magnetic track brake device being operated. A further brake device of this type can be distinguished, in particular, from a magnetic track brake device. For example, a braking operation can take place when a service brake device, such as a hydraulic or pneumatic or electrical brake apparatus, is operated and/or during operation of a service brake device of this kind. It should be noted here that operation of the magnetic track brake device at the cleaning current intensity is not intended to brake the vehicle. Rather, the rail can be cleaned during normal travel which can, for example, be driven. Therefore, it is expedient to use a low cleaning current intensity to not unnecessarily and undesirably impede travel. Provision can be made for the brake control device to be designed to increase the current intensity to a braking current intensity during cleaning of the rail using a magnetic track brake device when the brake control device receives a corresponding braking signal. Therefore, the magnetic track brake device can change over from a cleaning process to a deliberate braking process by simply increasing the current intensity, the braking process obviously likewise contributing to cleaning the rail.

The brake control device can be connected or connectable to a wheel rotation speed sensor device. Wheel slip data can be detected by means of a wheel rotation speed sensor device of this kind. It is conceivable, in particular, for the wheel slip data to relate to the wheel slip of at least one wheel or one wheel axle which is arranged downstream of the magnetic track brake device or a corresponding frictional component in the direction of travel, without further wheels being situated between magnetic track brake device or a corresponding frictional component and the wheel or wheels in question. Therefore, magnetic track brake devices or the frictional component and the wheels are situated physically close to one another, and the wheel slip data can be representative of the rail state close to the magnetic track brake device or of the frictional component. As an alternative or in addition, the wheel slip data can also relate to at least one wheel which is arranged upstream of the magnetic track brake device or a corresponding frictional component in the direction of travel.

In a development, the brake control device can be designed to vary the cleaning current intensity as a function of at least one wheel slip. In this case, the wheel slip can be received by the brake control device from a wheel rotation speed sensor device and/or a further control device. The wheel slip is closely related to an adhesion coefficient and therefore plays a considerable role in braking or else acceleration of the vehicle. In particular, provision can be made for the brake control device to be designed to set a wheel slip in a range which is desired for a specific operation of the rail vehicle by varying the cleaning current intensity. The wheel slip can relate to at least one wheel which can be arranged upstream of or downstream of the frictional component of the magnetic track brake device in the direction of travel. Provision can be made for a frictional component of the magnetic track brake device to be arranged between two wheels which run on the same rail. In this case, the two wheels and the frictional component of the magnetic track brake device in particular can be arranged on a common bogie. It is conceivable for the brake control device to be designed to monitor the wheel slip of the two wheels which surround the frictional component of the magnetic track brake device, and to compare the wheel slips with one another. The brake control device can be designed to actuate the magnetic track brake device based on the comparison of these wheel slips and/or to vary the cleaning current intensity. In particular, forces which are respectively exerted on the corresponding wheels, such as drive forces or braking forces or associated braking pressures, can be taken into consideration in the process. If substantially comparable wheel slips are present given comparable exerted forces and/or braking pressures in a magnetic track brake device which is operated for cleaning, it can be identified, for example, that the magnetic track brake device does not clean the rail in such a way that there is a difference in the adhesion coefficient or wheel slip of the wheels in question. In this case, the current intensity can be increased by the brake control device, for example. When a specific maximum current intensity which is intended for cleaning is reached, cleaning can be terminated by the brake control device to not subject the magnetic track brake device to unnecessary loading. To this end, the magnetic track brake device can be deactivated and/or moved to an inoperative position by the brake control device.

The brake control device can be connected or connectable to a braking action sensor device. The braking action sensor device can have, in particular, braking force sensors and/or braking torque sensors. This allows corresponding braking action data to be provided for the brake control device.

The brake control device can be designed to vary the cleaning current intensity as a function of at least one adhesion coefficient. Therefore, the cleaning current intensity can be controlled in such a way that a desired adhesion coefficient is produced. It is conceivable for the brake control device to be designed to actuate the magnetic track brake device in an adhesion-dependent manner. The adhesion coefficient can be determined and/or calculated based on data from wheel rotation speed sensors and/or wheel slip data and/or braking action data, such as braking force data and/or braking torque data, and/or vehicle speed data and/or braking pressure data and/or braking current data. The adhesion coefficient can be detected or determined for one or more wheels by the brake control device. Provision can be made for the brake control device to be designed to monitor an adhesion coefficient for at least one wheel during operation of a magnetic track brake device. If the frictional contact between the at least one wheel and the rail is improved by the use of the magnetic track brake device such that the adhesion coefficient exceeds a specific threshold value, the brake control device can deactivate the magnetic track brake device or reduce the amount of current applied to it. Several threshold values can be defined, it being possible for a different amount of current to be applied in each case when the threshold values are exceeded. The adhesion coefficient can be determined for one or more wheels which can be arranged upstream of and/or downstream of at least one frictional component of the magnetic track brake device. The brake control device can be designed to determine an adhesion coefficient upstream of at least one frictional component of the magnetic track brake device and downstream of the at least one frictional component in the direction of travel or in the direction in which the magnetic track brake device is pulled. The brake control device can be designed to vary the cleaning current intensity based on a comparison of the adhesion coefficients upstream of and downstream of the at least one frictional component. For example, the brake control device can be designed to increase the cleaning current intensity to achieve a desired adhesion coefficient or an increase in the adhesion coefficient when the comparison produces only a slight increase or no increase in the adhesion coefficient. If, when a specific maximum cleaning current intensity is reached, no increase or no predetermined sufficient increase in the adhesion coefficient downstream of the frictional component is achieved, the brake control device can terminate the cleaning operation. To this end, the magnetic track brake device can be deactivated by the brake control device and/or moved to an inoperative position. Analogously to the above-described actuation process, this variant is based on a comparison of wheel slip data and can be provided as an alternative or in addition to this.

In a development, the brake control device can be designed to vary the cleaning current intensity as a function of a change in a wheel slip and/or in an adhesion coefficient with respect to time. Therefore, the cleaning current intensity can respond, in particular, to a change in the rail state over relatively long sections since a change of this kind is reflected in the time profile for the wheel slip and/or adhesion coefficient. A change in the wheel slip and/or in the adhesion coefficient over time can also be taken into consideration in the above-described control operations.

Disclosed embodiments also relate to a brake system for a rail vehicle having at least one magnetic track brake device and a brake control device which is described in this document. The brake control device can be designed to actuate the magnetic track brake device. It is conceivable for the brake system to be a brake system which is described in this document. The brake system can comprise at least one further brake device which can be, in particular, a service brake device. The service brake device can be an electrically operated or pressure-operated service brake device, in particular a pneumatic or hydraulic service brake device. The service brake device and possibly further brake devices, for example a linear eddy-current brake device, can be actuable by an electronic control device. The control device can be the brake control device. It is conceivable for the brake control device to comprise the control devices for the further brake devices. Suitable sensors of a sensor device can be associated with the brake devices of the brake system. The sensor device can be a component of the brake system. Sensors can be, for example, wheel rotation speed sensors and/or braking action sensors, for example braking force sensors and/or braking torque sensors, and/or speed sensors and/or braking pressure sensors and/or braking current sensors.

Disclosed embodiments also relate to a rail vehicle having a brake system which is described in this document and/or having a brake control device which is described in this document.

Disclosed embodiments also relate to a method for cleaning a rail using a magnetic track brake device of a rail vehicle, wherein current can be applied to the magnetic track brake device at a variable current intensity to generate a braking force according to instructions from a brake control device. In the method, the magnetic track brake device is operated at a cleaning current intensity by the brake control device. The brake control device can be a brake control device which is described in this document. It is conceivable for the magnetic track brake device to be part of a brake system which is described in this document. The cleaning current intensity can be lower than a braking current intensity at which current is applied to the magnetic track brake device during a braking operation. The brake control device can be connected to a wheel rotation speed sensor device. It is conceivable for the cleaning current intensity to be varied by the brake control device as a function of at least one wheel slip. The brake control device can be connected or connectable to a braking action sensor device. Provision can be made for the cleaning current intensity to be varied by the brake control device as a function of at least one adhesion coefficient. As an alternative or in addition, the cleaning current intensity can be varied by the brake control device as a function of a change in a wheel slip and/or in an adhesion coefficient with respect to time.

Figure 1:
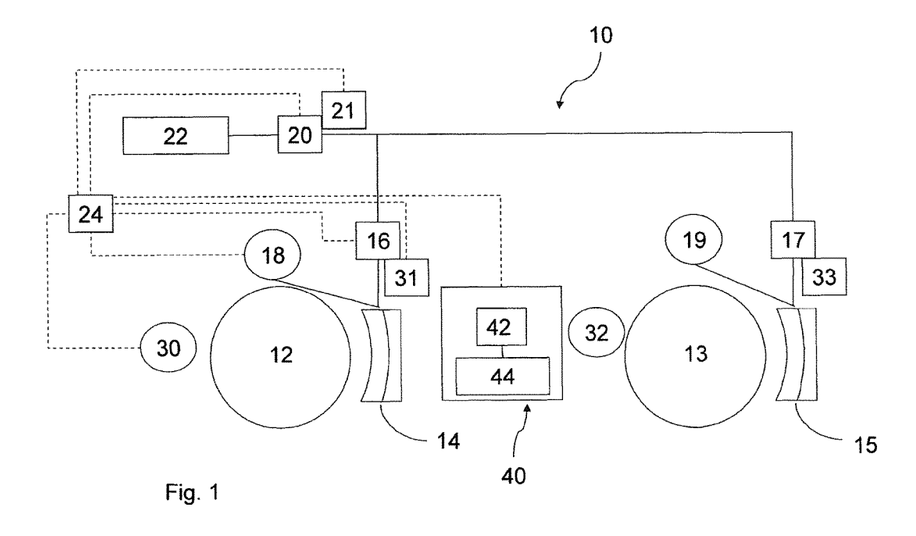
FIG. 1 shows a schematic illustration of a brake system of a rail vehicle having a brake control device.

FIG. 1 schematically shows a brake system 10 of a rail vehicle having a pneumatic service brake device. Mechanical and pneumatic connections and lines are illustrated using solid lines, whereas electrical connections or communications channels are illustrated using dashed lines. The brake system 10 is provided for the purpose of braking wheels 12 and 13 of the rail vehicle. In this example, the wheels 12 and 13 are located on different wheel axles, but on one bogie. The first wheel 12 has an associated first brake block 14. The second wheel 13 has an associated second brake block 15. Each of the brake blocks 14, 15 has a brake lining which brakes the associated wheel when the brake block is pressed against the running surface of the associated wheel 12, 13 by way of the brake lining. The brake block 14 can be operated by a force generator 16 for braking purposes. The force generator 16 is connected to a main control valve device 20 via a supply line. Compressed air can be fed to the force generator 16 via the main control valve device 20. Similarly, the brake block 15 has an associated force generator 17 which can likewise be supplied with compressed air via the main control valve device 20 for the purpose of operating the force generator, to bring the brake block 15 into contact with the wheel running surface of the wheel 13. The main control valve device 20 is connected to a compressed air reservoir device 22 from which it can draw compressed air to provide the compressed air to the force generators 16, 17 during a braking operation. Also provided is an electronic brake control device 24 which is a brake computer and can actuate the main control valve device 20. To this end, the main control valve device 20 can have, in particular, one or more solenoid valves which can be actuated by the brake control device 24. The brake control device 24 can receive braking data, for example from a train computer. Braking data can relate to, for example, a braking request, vehicle speed and/or a desired deceleration operation. For reasons of clarity, the electrical control lines for the components which are associated with the second wheel are not illustrated. However, the control lines are comparable to the control lines which are associated with the first wheel and its components. The first wheel 12 also has an associated braking action sensor 18 which can determine a braking force which is exerted on the brake block 14 and/or a braking torque in the event of a braking operation. The braking action sensor 18 can therefore be considered to be a braking force sensor. A braking action sensor of this kind can have, for example, one or more strain gauges. The sensor 18 is connected to the electronic brake control device 24 to transmit data. Furthermore, the wheel 12 has an associated first wheel rotation speed sensor 30 which can detect the rotation speed of the wheel 12. This sensor is also connected to the electronic control device 24 for data transmission purposes. Analogously, the second wheel has an associated second braking action sensor 19 which can determine a braking force which is exerted on the brake block 15 and/or a braking torque. Furthermore, the second wheel 13 also has an associated second wheel rotation speed sensor 32. The sensors 18, 19 can each be considered to be part of a braking action sensor device. The wheel rotation speed sensors 30, 32 can each be considered to be part of a wheel rotation speed sensor device. The force generators 16, 17 can each comprise pneumatic cylinders which exert a braking force on the associated brake block 14, 15 when a braking pressure is applied to the pneumatic cylinders. The force generators 16, 17 can furthermore each have a control valve device which can be actuated by the electronic control device 24 and via which a main braking pressure, which is provided by the main control valve device 20, can be set individually for the respective pneumatic cylinders of the force generators 16, 17. Therefore, in particular, the force generators 16, 17 can apply different braking pressures to the brake blocks 14, 15 and therefore asymmetrically or separately operate or actuate the friction brake devices according to instructions from the electronic control device 24. The main control valve device 20 has an associated main braking pressure sensor 21 which can detect the main braking pressure which is provided by the main control valve device 20. The pressure sensor 21 is connected to the electronic control device 24 to transmit data. Furthermore, the force generator 16 has an associated first braking pressure sensor 31, and the second force generator 17 has an associated second braking pressure sensor 33. The first and the second braking pressure sensors 31, 33 are each designed to detect the braking pressure which is provided individually for the purpose of generating a braking force by the associated force generator 16, 17. The sensors 31, 33 and also the main braking pressure sensor 21 can be considered to be part of a braking pressure sensor device. The braking pressure sensors 21, 31, 33 are likewise connected to the electronic brake control device 24 for data transmission purposes. Therefore, the electronic brake control device 24 can firstly detect the introduced main braking pressure downstream of the main control valve device 20. Secondly, the brake control device 24 in each case receives the braking pressure which is active individually for generating braking force in the individual force generators 16, 17. In FIG. 1, the force generator 16 having the brake block 14 can be considered to be the first friction brake device. The force generator 17 and the second brake block 15 can be considered to be the second friction brake device. It goes without saying that the two friction brake devices can have associated brake linkages and suspensions which are not shown. The wheel rotation speed sensors 30, 32 and the control valve devices which are associated with the force generators 16, 17 can take on functions of an antiskid device and/or be considered to be parts of an antiskid device of this kind. The main control valve device 20 together with the friction brake devices can be considered to be a pneumatic brake apparatus, and in particular a service brake device. The wheel rotation speed sensors 30, 32, the braking action sensors 18, 19 and also the pressure sensors 21, 31, 33 can therefore each be considered to be sensors which are associated with corresponding components of the service brake device. Instead of being in the form of block brakes, the friction brake devices can also be in the form of disk brakes. A respective braking action sensor which can detect a braking force which is exerted during the braking operation and/or a braking torque and which can transmit corresponding braking data to the electronic brake control device 24 can also be provided in this case. The brake control device 24 is designed to receive braking action data from the braking action sensors 18, 19 and braking pressure data from the braking pressure sensors 21, 31, 33. Furthermore, the brake control device 24 assigns the braking pressure data to corresponding braking action data and monitors the associated data. The brake system 10 further comprises a magnetic track brake device 40 with an operating device 42 and a frictional component 44 which are arranged between the wheels 12, 13 on the same bogie. The operating device 42 is provided for the purpose of moving the frictional component 44 from an inoperative position to a braking position, and vice versa, in the event of corresponding actuation. In this example, the operating device 42 can convert a pneumatic pressure or a drop in the pneumatic pressure into a movement of the frictional component 44. The frictional component 44 has a solenoid which, when current is applied to it, can move the frictional component 44 out of the braking position and into frictional contact with the rail. The brake control device 24 is connected to the magnetic track brake device 40 for actuation purposes and can actuate, in particular, the operating device 42. Furthermore, the brake control device 24 is designed to actuate the application of current to the solenoid of the frictional component 44. Provision is made for the brake control device 24 to be able to actuate application of current at a variable current intensity, so that, depending on the actuated current intensity, there is a different level of frictional contact between rail and magnetic track brake device 40. For the purpose of supplying current, the frictional component 44 can be connected or connectable to the on-board electrical system of the rail vehicle and/or to a current source which is independent of the rail vehicle. The brake control device 24 is designed to actuate the magnetic track brake device 40 based on rail state data. The rail state data originates from sensors and/or is based on state data which is associated with the friction brake devices of the pneumatic brake apparatus of the brake system 10, that is to say of the service brake device. The state data is based, in particular, on data from the sensors 18, 19, 21, 30, 31, 32, 33. Provision is made for the brake control device to determine rail state data, which relates, in particular, to an adhesion between the wheels 12, 13 and the rail, based on data which is determined from the sensors. Therefore, the brake control device 24 can use data from the wheel rotation speed sensors 30, 32, and/or from a wheel slip which is determined on the basis of the data, to determine whether one of the wheels 12, 13 skids or is blocked. As an alternative or in addition, an adhesion coefficient which prevails for the wheels 12, 13 can be determined in each case. The brake control device 24 actuates the magnetic track brake device 40 in an adhesion-dependent manner based on rail state data of this kind. The brake control device 24 is designed to receive a cleaning signal and, in response to the signal, to operate the magnetic track brake device 40 in such a way that the frictional component comes into contact with the rail or an intermediate layer which is situated on the rail. In this case, a predetermined cleaning current intensity is set by the brake control device 24. The cleaning current intensity is lower than a braking current intensity with which the magnetic track brake device is generally operated or has current applied to it for a braking operation. During cleaning of the rail, further brake devices of the brake system are optionally not operated, so that the vehicle is only slightly braked, it being possible for this to be easily compensated for, for example, by an increased drive power. To this end, provision can be made, for example, for a drive computer or a central computer of the rail vehicle to be designed to actuate a corresponding increase in the drive power of the rail vehicle when there is a cleaning signal and/or when there is a signal which indicates the cleaning current intensity and/or a signal which indicates the braking force which is exerted by the magnetic track brake device. The cleaning signal and/or the signal which indicates the cleaning current intensity and/or the signal which indicates the braking force which is exerted by the magnetic track brake device can be provided, for example, by the brake control device 24. Therefore, a desired speed can be maintained even when the magnetic track brake device is used for cleaning purposes. The brake control device 24 is designed to vary the current intensity based on rail state data, such as adhesion coefficient data and/or wheel slip data. If, for example, a desired adhesion coefficient is not achieved during operation of the magnetic track brake device 40 for cleaning the rail, or there is a deviation in the wheel slip from a desired wheel slip value, the brake control device 24 can vary the current intensity to set a desired value of adhesion coefficient and/or wheel slip. The brake control device 24 can, in general, be designed to compare rail state data, in particular the adhesion coefficient or a wheel slip, in respect of a wheel 12 which is situated upstream of the frictional component of the magnetic track brake device 40 in the direction of travel, with corresponding rail state data in respect of a wheel 13 which is situated downstream of the frictional component 44 of the magnetic track brake device 40 in the direction of travel. Based on a comparison of this kind, it is possible, for example, to monitor whether the use of the magnetic track brake device 40 changes the adhesion conditions. If use of the magnetic track brake device 40 does not lead to a desired change, the brake control device 24 can either increase the cleaning current intensity or, when a maximum current intensity has already been reached, deactivate the magnetic track brake device since a change in the adhesion conditions cannot be achieved by use of the magnetic track brake device.

Figure 2:
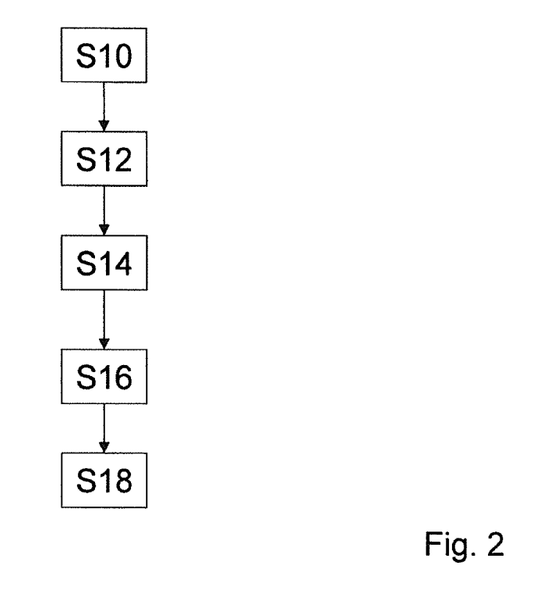
FIG. 2 shows a schematic flowchart of a method for actuating at least one magnetic track brake device.

FIG. 2 shows a flowchart of a method for cleaning a rail using a magnetic track brake device. In a step S10, a brake control device receives a cleaning signal. The cleaning signal can be provided, for example, by a train computer or a train driver. The brake control device can be a brake control device as described in FIG. 1. The brake system and the magnetic track brake device can, for example, likewise be the devices which are shown in FIG. 1. In a step S12, the brake control device actuates the magnetic track brake device in such a way that a frictional component is moved into a braking position. In this case, provision can be made for there to already be contact between a frictional component of the magnetic track brake device and the rail or an intermediate layer which is situated on the rail in a braking position. In an optional step S14, provision may be made for the brake control device to apply a current to a solenoid of the magnetic track brake device at a cleaning current intensity, to establish improved contact with the rail. In this case, the cleaning current intensity can be, in particular, lower than a normal braking current intensity. In a subsequent step S16, the brake control device can determine specific operating parameters, such as a wheel slip and/or an adhesion coefficient, for one or more wheels. To this end, provision can be made for the brake control device to receive corresponding data. The brake control device can vary the current intensity in step S18 based on the parameters. In this case, for example, the current intensity at which current is applied to the magnetic track brake device or a solenoid of the magnetic track brake device can be set in such a way that a desired wheel slip and/or a desired adhesion coefficient is set.

The features of the invention which are disclosed in the preceding description, in the drawings and also in the claims may be essential for realizing the invention both individually and in any desired combination.

LIST OF REFERENCE SIGNS

10 Brake system
12 First wheel
13 Second wheel
14 First brake block
15 Second brake block
16 First force generator
17 Second force generator
18 First brake force sensor
19 Second brake force sensor
20 Main control valve device
21 Main brake pressure sensor
22 Compressed air reservoir device
24 Brake control device
30 First wheel rotation speed sensor
31 First brake pressure sensor
32 Second wheel rotation speed sensor
33 Second brake pressure sensor
40 Magnetic track brake device
42 Operating device
44 Frictional component

The invention claimed is:

1. A brake control device for a brake system of a rail vehicle, the brake system comprising:
at least one magnetic track brake device to which current applied at a variable current intensity generates a braking force according to instructions from the brake control device,
wherein the brake control device is designed to operate the at least one magnetic track brake device at a cleaning current intensity to clean a rail during travel.

2. The brake control device of claim 1, wherein the cleaning current intensity is lower than a braking current intensity at which current is applied to the magnetic track brake device during a braking operation.

3. The brake control device of claim 1, wherein the brake control device is connected or configured to be connected to a wheel rotation speed sensor device.

4. The brake control device of claim 1, wherein the brake control device varies the cleaning current intensity as a function of at least one wheel slip.

5. The brake control device of claim 1, wherein the brake control device is connected or configured to be connected to a braking action sensor device.

6. The brake control device of claim 1, wherein the brake control device is varies the cleaning current intensity as a function of at least one adhesion coefficient.

7. The brake control device of claim 1, wherein the brake control device varies the cleaning current intensity as a function of a change in a wheel slip and/or in an adhesion coefficient with respect to time.

8. A brake system having a magnetic track brake device and a brake control device as claimed in claim 1.

9. A rail vehicle having a brake system as claimed in claim 8.

10. A rail vehicle having a brake system having a brake control device as claimed in claim 1.

11. A method for cleaning a rail using a magnetic track brake device of a rail vehicle, the method comprising:
applying current to the magnetic track brake device at a variable current intensity to generate a braking force according to instructions from a brake control device, wherein, the magnetic track brake device is operated at a cleaning current intensity by the brake control device to clean a rail during travel.

* * * * *